US006411095B1

United States Patent
Chin et al.

(10) Patent No.: US 6,411,095 B1
(45) Date of Patent: Jun. 25, 2002

(54) APPARATUS AND METHOD FOR LOCATING AN OBJECT

(75) Inventors: Daniel C. Chin, Bethesda; Rengaswamy Srinivasan, Ellicott City; Paul R. Zarriello, Catonsville, all of MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/305,718

(22) Filed: May 5, 1999

Related U.S. Application Data

(60) Provisional application No. 60/084,220, filed on May 5, 1998.

(51) Int. Cl.[7] .................................................. G01V 3/08
(52) U.S. Cl. ....................... 324/326; 324/345; 324/357; 324/359
(58) Field of Search ................................ 382/109, 128, 382/131; 324/354, 357, 326, 691, 725, 345, 327, 329, 347, 358, 359

(56) References Cited

U.S. PATENT DOCUMENTS

| | | | |
|---|---|---|---|
| 4,539,640 A | * 9/1985 | Fry et al. ..................... | 364/414 |
| 4,617,939 A | 10/1986 | Brown et al. ................. | 128/734 |
| 5,272,624 A | 12/1993 | Gisser et al. .......... | 364/413.013 |
| 5,284,142 A | 2/1994 | Goble et al. ............. | 128/653.1 |
| 5,381,333 A | 1/1995 | Isaacson et al. ........ | 364/413.13 |
| 5,390,110 A | 2/1995 | Cheney et al. .......... | 364/413.13 |
| 5,408,182 A | 4/1995 | Stolarczyk et al. .......... | 324/338 |
| 5,440,647 A | * 8/1995 | Floyd, Jr. et al. ............ | 382/132 |
| 5,465,730 A | 11/1995 | Zadehkoochak et al. .... | 128/734 |
| 5,495,175 A | 2/1996 | Ramirez et al. ............. | 324/357 |
| 5,513,098 A | 4/1996 | Spall et al. .................. | 364/158 |
| 5,668,717 A | 9/1997 | Spall ........................... | 364/148 |

OTHER PUBLICATIONS

Green, "Bayesian Reconstructions From Emission Tomography Data Using a Modified EM Algorithm," IEEE Transactions on Medical Imaging, vol. 9, No. 1, pp. 84–93 (Mar. 1990).*

* cited by examiner

Primary Examiner—Jay Patidar
(74) Attorney, Agent, or Firm—Francis A. Cooch

(57) ABSTRACT

The invention is directed to an apparatus and method for locating objects in a body through the mapping and imaging of the conductivity profiles of such objects by applying a force to the object and/or body and measuring certain characteristics of the body responsive to the application of force. In accordance with a preferred embodiment, the force applied to the object and body is in the form of an electrical voltage or current such that electrical potentials, currents, and magnetic fields are generated throughout the subsurface site. The voltage, current, or magnetic field is then measured at the surface or the boundary of the body. An estimate of subsurface conductivity is then made and a conductivity profile generated by minimizing a loss function. Preferably, the loss function is in the form of the sum square of the differences between measurement values and a set of computed values based on a gradient approximation technique. In a preferred embodiment, the approximation technique is a simultaneous perturbation stochastic approximation (SPSA). To characterize the object within the body, a conductivity profile is then constructed using a numerical technique such as a finite element method (FEM) to compute the potentials or magnetic fields along with the experimental values measured at the boundary of the site. The characterization of the object includes its location, size, and conductivity.

13 Claims, 9 Drawing Sheets

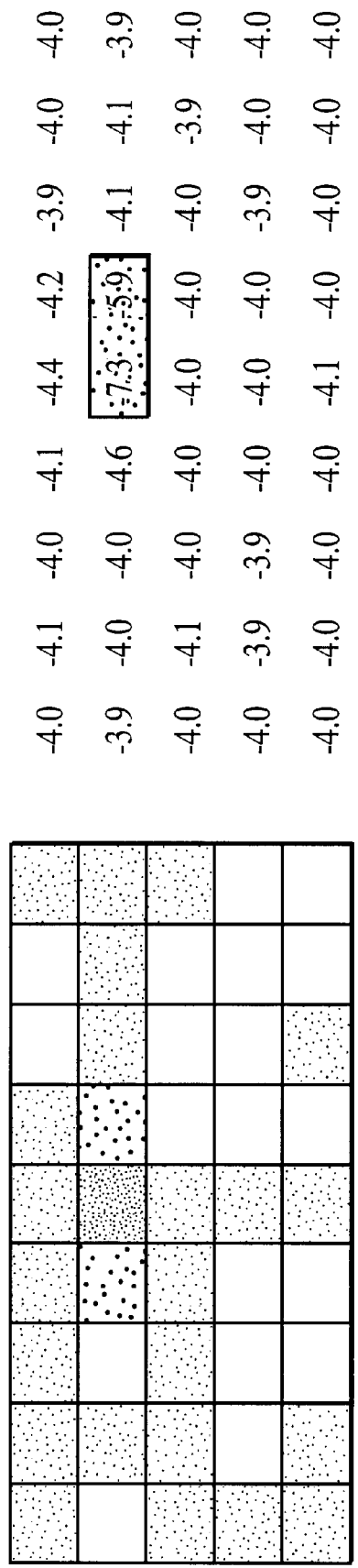
FIG. 4b
OBJECT 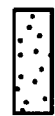
FIG. 4a
CONDUCTIVITY (LOW - HIGH) 

SIMULATED PLASTIC OBJECT

CONDUCTIVITY (LOW - HIGH)

| -3.8 | -4.1 | -4.1 | -4.2 | -4.1 | -3.9 | -3.9 | -3.9 |
| --- | --- | --- | --- | --- | --- | --- | --- |
| -4.1 | -4.2 | -3.9 | -4.1 | -2.1 | -4.1 | -4.1 | -4.0 |
| -4.1 | -3.9 | -4.1 | -2.4 | -2.3 | -4.1 | -3.9 | -3.9 |
| -4.1 | -3.9 | -3.8 | -3.1 | -3.5 | -3.9 | -3.9 | -3.9 |
| -4.0 | -4.2 | -3.9 | -3.9 | -4.4 | -4.1 | -3.9 | -3.9 |
| | | | -3.9 | -3.1 | -4.1 | | |
| | | | | -2.3 | | | |

▢ SIMULATED METAL OBJECT

CONDUCTIVITY (LOW – HIGH)

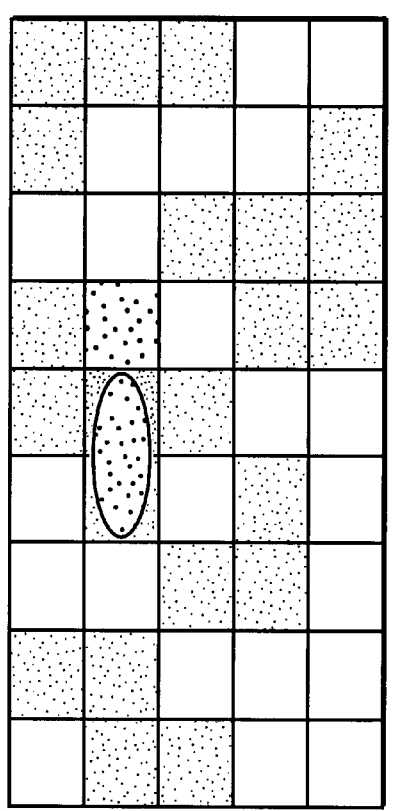
FIG. 8b  BURIED PLASTIC OBJECT
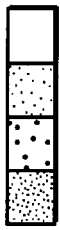
FIG. 8a  CONDUCTIVITY (LOW - HIGH)

APPARATUS AND METHOD FOR LOCATING AN OBJECT

CROSS-REFERENCE TO RELATED APPLICATION

This application claims the benefit of prior filed copending U.S. provisional application serial No. 60/084,220, filed May 5, 1998.

STATEMENT OF GOVERNMENTAL INTEREST

This invention was made with Government support under Contract No. N00029-97-C-8119 awarded by the Department of the Navy. The Government has certain rights in the invention.

BACKGROUND OF THE INVENTION

Currently, millions of objects remain buried worldwide ranging from small-sized land mines to large-size waste disposal and storage drums. Presently over 10,000 suspected contaminated sites at current and former United States Department of Defense (DoD) installations are coming under remediation and reclamation. These sites contain everything from a motor pool, laundry or landfill, to an array of abandoned-ordnance. The task of reclaiming lands filled with mines, ammunition, and chemical wastes is far from simple.

In addition, techniques to locate, identify and characterize buried objects such as reinforcing bars (rebars), fibers and cracks in concrete structures, composite materials, and other metallic and non-metallic structures are in great demand. The most useful techniques are those that can locate, identify and characterize buried objects in real time. Similarly, in biological systems, techniques that can provide conductivity profile of the interior of a body, object or system are of great commercial and technological importance.

Various methods have been developed to detect buried objects. These methods include electromagnetic and magnetometer sensors, ground penetrating radar, infrared, and several types of chemical and spectroscopic tools.

Subsurface conductivity measurements, sometimes termed conductivity-tomography or electrical impedance-tomography, have been reported in the published literature since the late 1970s (see B. H. Brown, D. C. Barber, Wei Wang, Liquin Lu, A. D. Leathard, R. H. Small wood, A. R. Hampshire, R. Mackay, and K. Hatzigalanis, 1994, "Multi-Frequency Imaging and Modeling of Respiratory Related Electrical Impedance Changes," *Physiol. Meas.*, Vol. 15, A1–A12; R. D. Cook, G. J. Saulnier, D. G. Gisser, J. C. Goble, J. C. Newell and D. Isaacson, 1994, "ACT3: A High-Speed, High-Precision Electrical Impedance Tomograph," *IEEE Trans. Biomed. Eng.*, Vol. 41, No. 8, pp. 713–722, and references therein; and R. W. Smith, I. L. Freeston, and B. H. Brown, 1995, "A Real-Time Electrical Impedance Tomography System for Clinical Use—Design and Preliminary Results," *IEEE Trans. Biomed. Eng.*, Vol. 42, No. 2, pp. 133–140, and references therein). These measurements have been widely used in mapping the internal conductivity of biological bodies, as well as geological sites. These techniques involve placing electrodes around the sites with objects under investigation, and sending a known amount of electrical current through the site. The current generates electrical potentials or fields that are measured using another set of electrodes placed on that surface. Next, the internal conductivity of the object is reconstructed using the measured potential values, injected current, and the location of the electrodes.

Several types of mathematical reconstruction algorithms have been used and reported since 1970s (see B. H. Brown, D. C. Barber, A. H. Morice, and A. D. Leathard, 1994, "Multi-Frequency Imaging and Modeling of Respiratory Related Electrical Impedance Changes," *IEEE Trans. Biomed. Eng.*, Vol. 41, No. 8, pp. 729–733; Smith et al., 1995; and A. Wexler, B. Fry and M. R. Neuman, 1985, "Impedance-Computed Tomography Algorithm and System," *Applied Optics*, Vol. 24, No. 23, pp. 3985–3993). Most of these techniques have attained a certain level of qualified success. Using these techniques the subsurface conductivity can be mapped 1) when the differences between the conductivity values of the site elements and objects are small; and 2) when the internal gradients of the potentials can accurately be calculated (Cook et al., 1994).

However, none of these techniques has been successful in locating of plastic or metal mines buried at shallow depths. Objects buried under surfaces tend to have widely varying electrical properties. Furthermore, accuracy in the potential measurements often cannot be assured. In addition, the current and potential data are likely to be corrupt with noise in the field, and measurement of distances between the locations of electrodes is also subject to uncertainties. Under such restricted conditions of the field, reconstructing conductivity values obtained using conventional gradient-base techniques (see Brown et al., 1994, and Smith et al., 1995) may not be truly representative of the subsurface structure and contents. For these reasons, locating small-sized objects such as mines through conductivity measurements has so far remained largely unsuccessful.

SUMMARY OF THE INVENTION

The invention is directed to an apparatus and method for locating objects in a body through the mapping and imaging of the conductivity profiles of such objects by applying a force to the object and/or body and measuring certain characteristics of the body responsive to the application of force. In accordance with a preferred embodiment, the force applied to the object and body is in the form of an electrical voltage or current such that electrical potential, currents, and magnetic fields are generated throughout the subsurface site. The voltage, current, or magnetic field is then measured at the surface, above the surface or at the boundary of the body. A global stochastic approximation technique, modified simultaneous perturbation stochastic approximation (SPSA), is then used to estimate the subsurface conductivity and the locations of the objects by minimizing a loss function. The loss function is formed from the total errors between the measured values from sensors and the computed values from the conductivity profile and the locations of the objects by finite element method (FEM). The object locations and conductivities identify the object types and their material composition. There are two distinct components to the approach, one is the use of a modified SPSA; another is estimation of the location and conductivity of the objects in conjunction with the conductivity profile of the finite element model.

The invention differs from others (for example, "Electrical Resistance Tomography for Imaging the Spatial Distribution of Moisture in Pavement Sections" by M. Bultnev, A. Ramirez, and W. Daily" in Proceedings of the Structural Materials Technology: an NDT Conference, Eds: P. E. Hartbower and P. J. Stolarski, February 1996, San Diego, p. 342 ) in several ways. 1. It uses magnetic field measurements from above surface, and potential (voltage) measurements from the soil surface. 2. It can be operated with either magnetic field measurements only, or the potential measurements only. 3. This invention uses a modified SPSA gradient approximation algorithm as compared with conventional numerical gradient algorithms used by others. 4. The modified SPSA algorithm avoids ambiguities and uncertainties in the field setting. 5. Use of the modified SPSA to estimate the finite element model for the subsurface and the locations and the conductivities of the objects help characterize objects that are smaller than the size of the elements in the finite element model.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 4 is a cross-sectional view of reconstruction of a conductivity profile produced in accordance with a preferred embodiment of the invention;

FIGS. 8a and 8b are a reconstruction of the conductivity profile for a buried plastic object;

DETAILED DESCRIPTION OF PREFERRED EMBODIMENTS

The invention will be described in detail with reference to the preferred embodiments illustrated in FIGS. 1–8b. The invention is described herein in its preferred application for the detection of objects buried in the subsurface of soil or other ground cover. However, the invention may be applicable to any type or configuration of noninvasive or invasive detection systems used in plumes, concrete structures, composite materials, and biological systems that encounter the same or similar problems overcome by the invention described herein.

Figure 1:
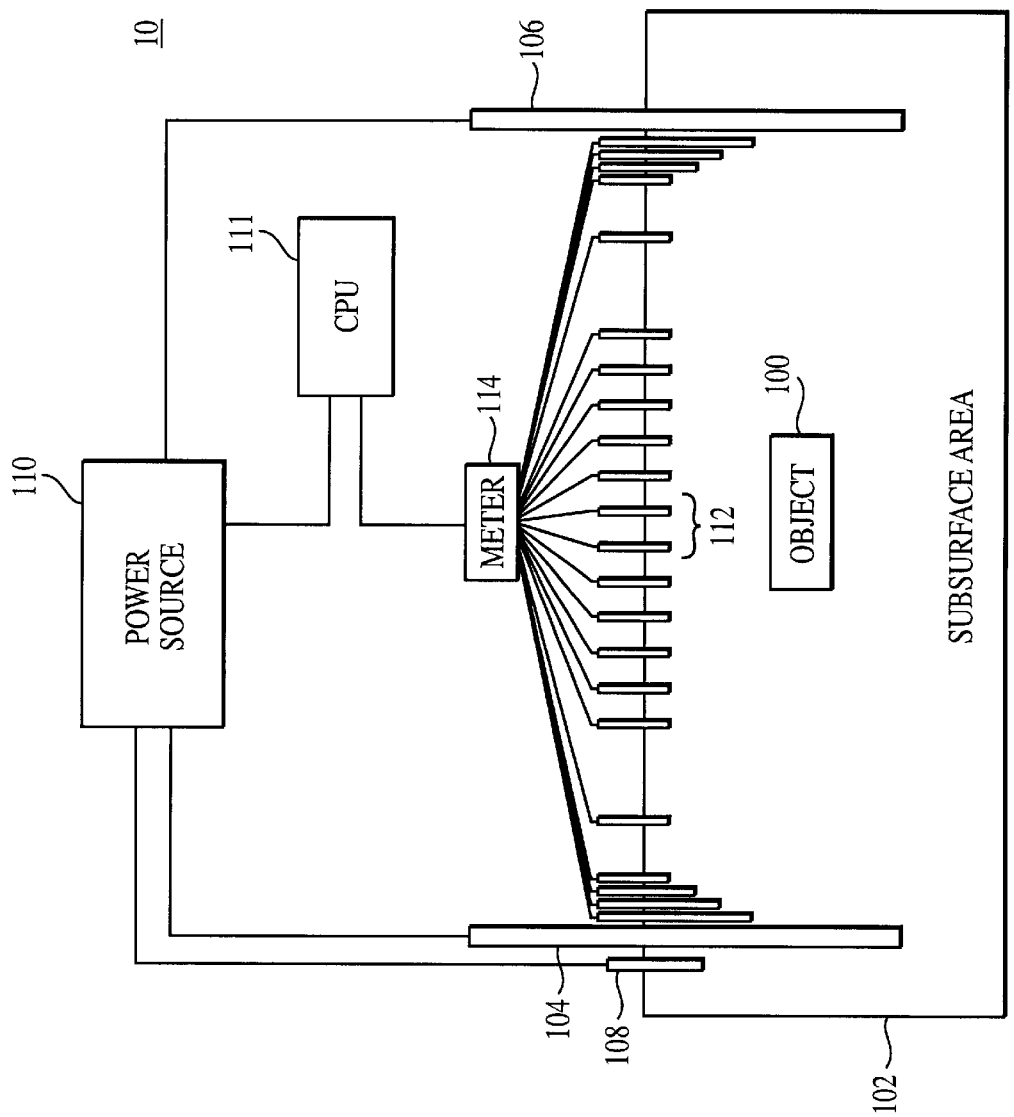
FIG. 1 is a cross-sectional view of the apparatus constructed in accordance with a preferred embodiment of the invention.

FIG. 1 shows a subsurface object locator device 10 constructed in accordance with a preferred embodiment of the invention to detect an object 100 buried within subsurface site area 102. The object may be a land mine, waste disposal and storage drum, or any other metallic or non-metallic object. In the preferred embodiment, the object locator 10 applies an electromagnetic force in the form of an electric voltage or current using rods 104, 106 and power source 110. The rods 104, 106 are preferably made of a conductive material such as metal, and may have any of a variety of shapes and surfaces. Rods 104, 106 are particularly illustrated with cylindrical surfaces which are partially electrically insulated such that only their tips are conducting to subsurface site area 102. The rods 104, 106 are preferably placed on either side of the area 102 to be tested.

The power source 110 is one of many known devices (e.g., a galvanostat) capable of delivering voltage or current, particularly capable of providing constant levels even under conditions of varying electrical resistance in the area 102. In this preferred embodiment, power source 110 supplies an alternating current (AC) signal, preferably of low-amplitude (i.e., 1 mA–500 mA) to the subsurface site area 102 through rods 104, 106. (It should be understood that higher amplitude signals may also be used as desired for specification applications.) The AC signal may be a single frequency or a multi-frequency signal of any given frequency, preferably, however, having a frequency from about 1 to about 1000 Hz for locating objects buried in soil and the like.

In the illustrated embodiment, a reference electrode 108 is provided at the surface of area 102 to regulate the currents between rods 104, 106. A plurality of sensing electrodes 112 are provided along the top surface of area 102, as shown in FIG. 1. These sensing electrodes 112 may be constructed of any conducting material, for example silver/silver chloride electrodes. The locations of the sensing electrodes 112 are dependant upon the accuracy of the detection reading desired, the spacing between rods 104 and 106, the number of sensing electrodes 112 in use, as well as other factors. Attached to each sensing electrode 112 is meter 114 used to quantify or measure characteristics of the surface of site area 102. (The sensing electrodes 112 can be replaced by sensing magnetometers.) In the preferred embodiment, meter 114 is a spectrum analyzer used to measure the voltage potential, current and/or magnetic field of the site area 102 at the various points along the surface where each sensing electrode 112 is located. The entire object locator device 10 is controlled by central processing unit (CPU) 111, shown directly connected to power source 110 and meter 114. CPU 111 may be any processor or computing device known in the art for controlling system components, performing mathematical computations, and executing algorithms and other programmed instructions.

Figure 2:
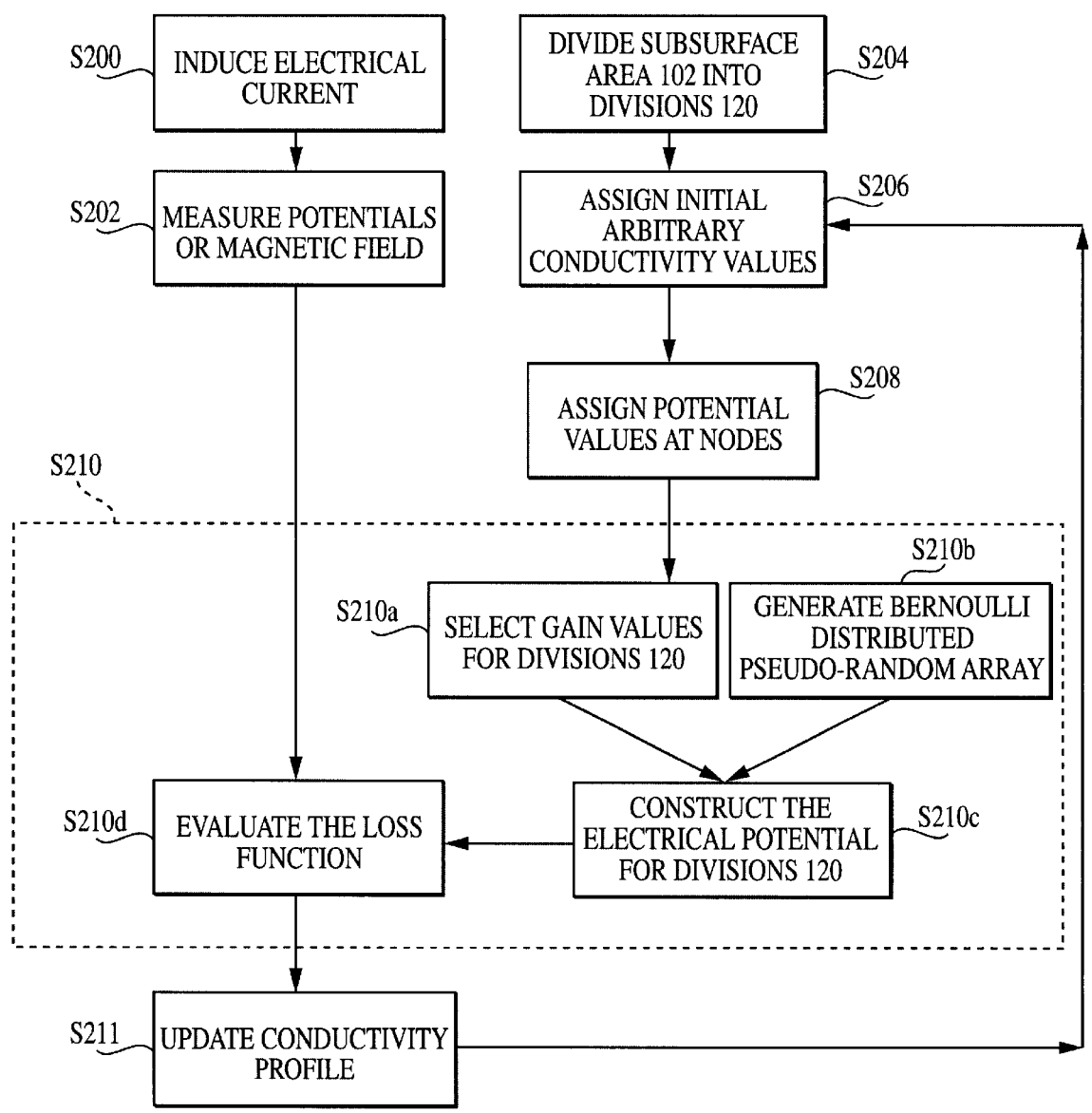
FIG. 2 is a flow chart of the electrical conductivity object locator technique of the invention.

In operation, the object locator device 10 maps and images conductivity values of the soil subsurface site area 102 and characterizes the buried foreign object 100 utilizing the method steps illustrated in FIG. 2. (Although it should be readily apparent that alternatively constructed devices may similarly perform the same (or equivalent) method steps to achieve the same or substantially the same results in accordance with the invention.)

In step S200, current flow is induced within area 102 by applying a voltage or current signal from power source 110 to site area 102. In the preferred embodiment, AC current flow is induced between rods 104 and 106. In step S202, the potential (or alternatively, the current or magnetic field strength) at the surface of the subsurface site area 102 and along the boundary of rods 104, 106 is measured using sensing electrodes 112 (or sensing magnetometers) and meter 114. These measurements are transferred to CPU 111 in step S202.

Figure 3A:
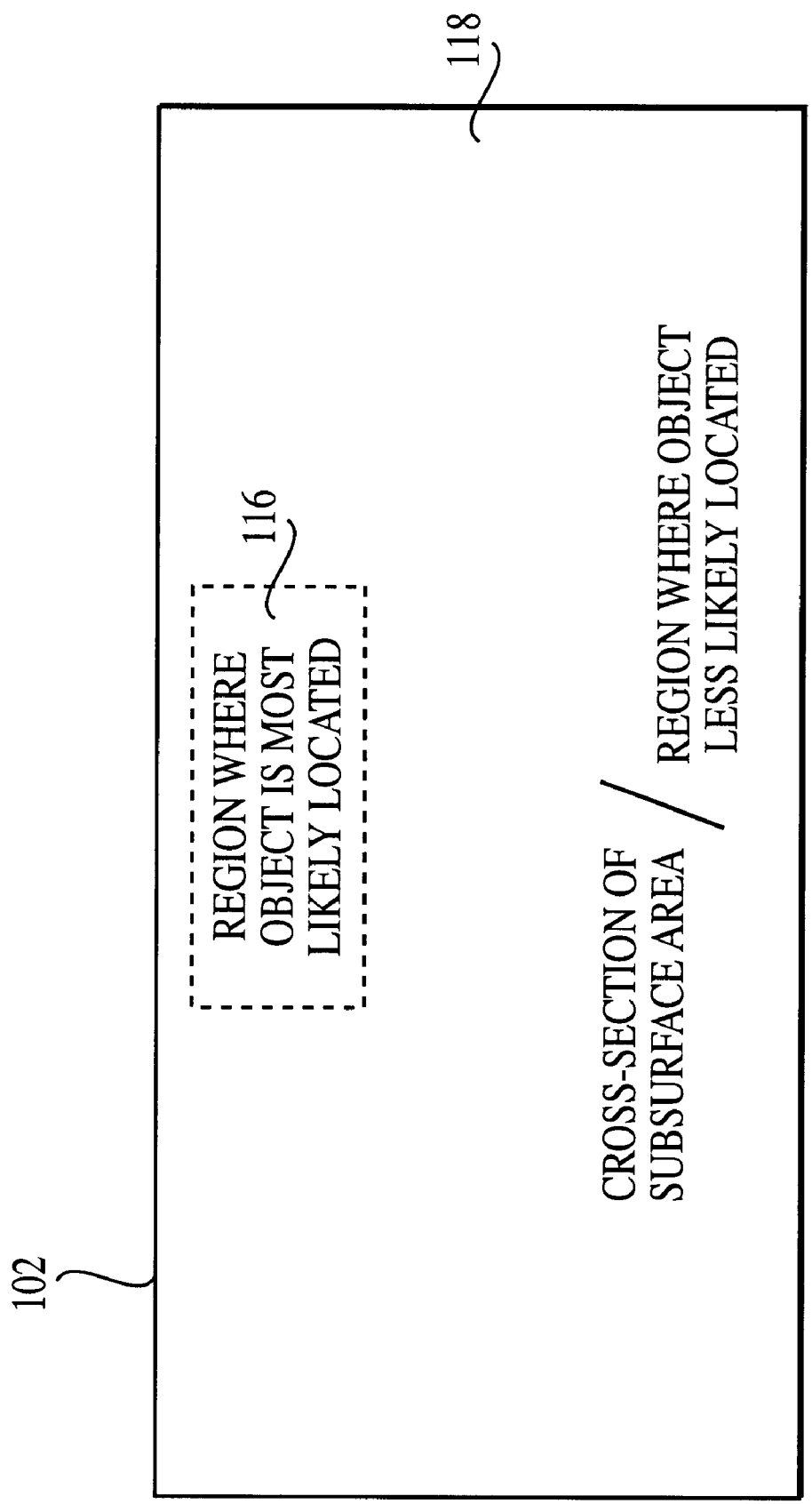
FIG. 3a is a cross sectional view of the subsurface area of FIG. 1.
Figure 3B:
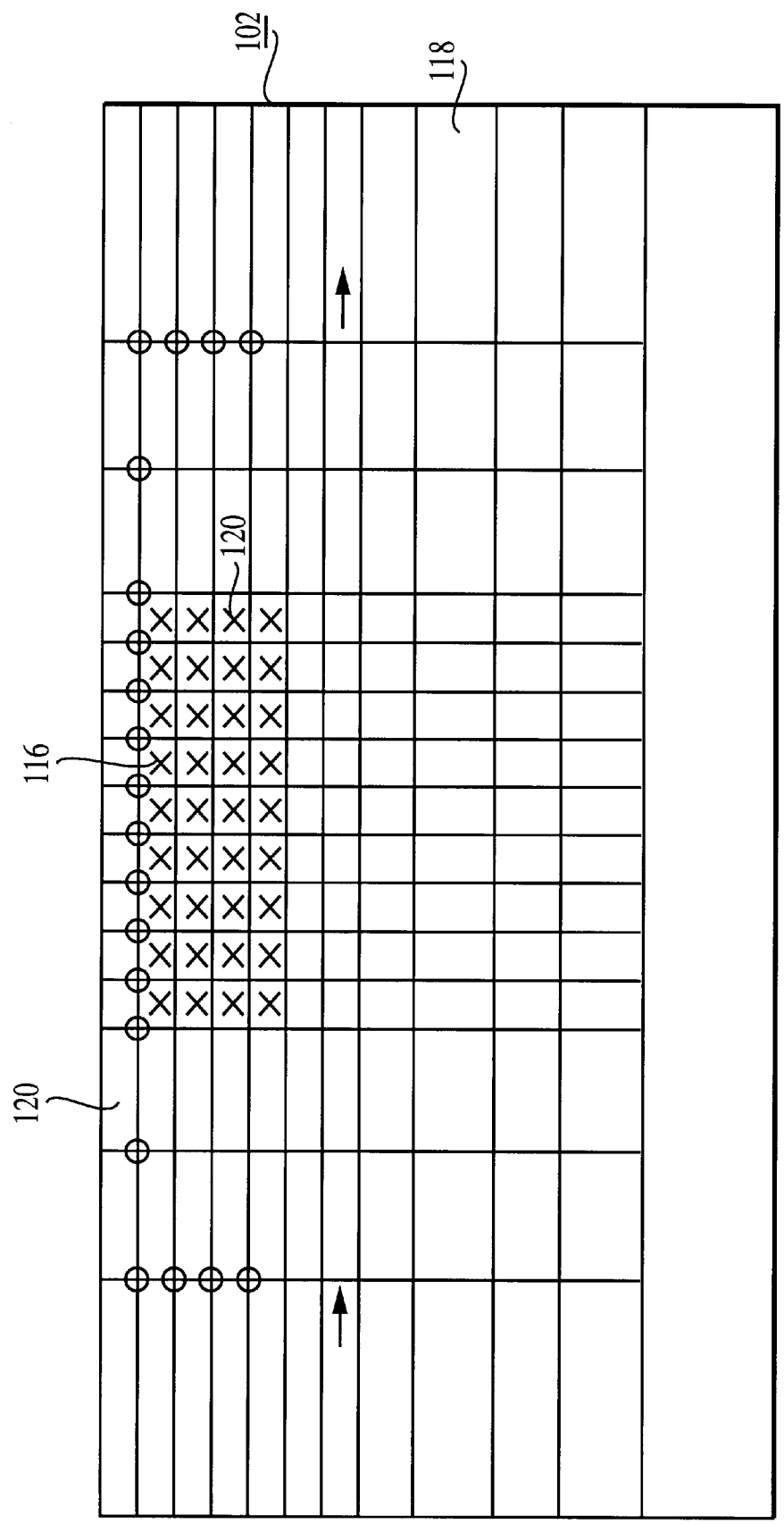
FIG. 3b is another cross sectional view of the subsurface area of FIG. 1.

Using a finite element method (FEM) in accordance with this embodiment of the invention, the object or space under consideration, e.g. area 102, is divided into different regions in step S204. Each region is subdivided into small divisions with constant conductivity ($\sigma_i$, where the subscript i represents the $i^{th}$ element conductivity), and when put together, all the regions within the object are represented by a piece-wise homogeneous model. Accordingly, a two-dimensional location, a sub-space of a three-dimensional location, is used to simulate the conductivity of the area 102 prior to the location of the object 100 being known. The two-dimensional location is shown in FIG. 3a by a cross-section of the area 102. There are two distinct regions 116, 118 defined within the area 102. Region 116 is the section of area 102 within which the object 100 is most likely located. For analysis of the two-dimensional location, each region 116, 118 is divided into smaller elements 120 as shown in FIG. 3b. Each element 120 is an element for use in a finite element method analysis of the two dimensional location. The center region 116 is the region of interest, though the region 118 does influence region 116, and is divided into 36 equal size elements 120. (Note, the invention also contemplates dividing a three-dimensional representation of the subsurface of the body into a plurality of finite elements.)

Each element 120 is given an initial arbitrary conductivity ($\sigma$) value in step S206. The initial arbitrary conductivity value ($\sigma$) may be either measured at a real location, or obtained through computer simulation. It is often advantageous to obtain the conductivity values through a simulation study or by using known values for specific materials. A major advantage in such an approach is that most objects such as pieces of earth, blocks of concrete, metals, fluids, biological materials or various combinations of them can be easily simulated making direct measurements on real objects for the purpose of developing a tomographic technique to be time-consuming and expensive.

Next, a modified FEM method is used to generate potentials at the node 121 of each element 120 based upon the arbitrary conductivity values which have been assigned to each element 120 in step S208. In the present case, the FEM method is based on a generalized Laplace equation which has been modified to make it compatible with the nonlinear inverse algorithm which is used to analyze the conductivity values of the area 102 at a later step. For a 3-dimensional (3D) model, this equation is of the form:

$$\nabla(\sigma \nabla \phi) = \frac{\rho}{\varepsilon_0} \text{ or}$$
$$\frac{\partial}{\partial x}\left(\sigma \frac{\partial \phi}{\partial x}\right) + \frac{\partial}{\partial y}\left(\sigma \frac{\partial \phi}{\partial y}\right) + \frac{\partial}{\partial z}\left(\sigma \frac{\partial \phi}{\partial z}\right) = -\frac{\rho}{\varepsilon_0}$$

where $\sigma$ is the conductivity, $\phi$ is the internal voltage, $\rho$ is the internal charge density and is non-zero only in the areas that contain a current source, and $\varepsilon_0$ is the free space permitivity.

The electrical boundary conditions for the area 102 are defined using either of the two well-known conditions based upon electrical current or electrical potential, also known as the Neumann condition. The electrical potential or electrical current is defined at several locations at or within the boundaries of area 102. The modified FEM method is then used to compute the electrical potential and the current everywhere else in area 102. The Neumann conditions are defined at the rods 104, 106 that are used in injecting the current into the area 102, the following mathematical analysis is applied:

For a body surrounded by air the active current electrode rods 104 106, with current density J, has:

$$-\sigma \frac{\partial \phi}{\partial n} = J$$

on the electrodes; and $$-\sigma \frac{\partial \phi}{\partial n} = 0$$

at the interface of the area 102 and air, where $\delta\phi/\delta n$ is the derivative of the potential normal to the interface of the area 102 and the rods 104, 106. The air of the object-air interface represents a phase that is not of interest to the determination of the location of object 100, but is present adjacent to the area 102 under investigation and, therefore, must be considered in the FEM analysis.

The electrical boundary condition for the area 102 is preferably defined by a Neumann boundary condition, also called an impedance boundary condition in which the impedance values are specified at the interface between regions, e.g. regions 116 and 118 of the area 102 with different conductivities. This condition is generally assumed to be valid at the interface between adjacent elements 120 with conductivities $\sigma_i$ and $\sigma_j$ having the following form:

$$\sigma_i = \sigma_j$$

and $$\sigma_i \frac{\partial \phi_i}{\partial n} = \sigma_j \frac{\partial \phi_j}{\partial n}.$$

The solution for the generalized Laplace equations is found to be equivalent to the minimization of the following functional:

$$F(\phi) = \frac{1}{2} \int \int \int_s \left\{ \sigma \left(\frac{\partial \phi}{\partial x}\right)^2 + \sigma \left(\frac{\partial \phi}{\partial y}\right)^2 + \sigma \left(\frac{\partial \phi}{\partial z}\right)^2 \right\} dxdydz + \int_s \frac{\rho}{\varepsilon} \phi dn$$

The above equation is called the Galerkin's error minimization method. For minimizing $F(\phi)$, its partial derivatives with respect to the nodal voltages, the voltages at the corners of the elements 120, of each element 120 must be zero. Hence, $$\frac{\partial F(\phi)}{\partial \phi} = 0$$

for every node 121. Note that the elements of the FEM, in this case elements 120, can have a wide variety of shapes and sizes, and each element will be associated with as many number of node 121 as the number of sides (or corners) that it has. This results in potential values being assigned for the nodes 121 of each element 120 within area 102.

Next, having obtained potential values for each node 121, the invention minimizes the difference between the measured potentials from the sensing electrodes 112 and the calculated potential values from the FEM method to perturb the arbitrary conductivity profile of step S206. To obtain an internal conductivity profile from the calculated potential values produced by the FEM and the measured values obtained from the sensing electrodes 112, a reconstruction procedure is applied which uses an iterative gradient approximation type algorithm in step S210. The reconstruction procedure is preferably accomplished through the use of a simultaneous perturbation stochastic approximation (SPSA) algorithm as described in U.S. Pat. No. 5,668,717 (Spall) and Spall, J. C. (1992), "Multivariate Stochastic Approximation Using a Simultaneous Perturbation Gradient Approximation," IEEE Trans. on Automatic Control, vol. 37, pp. 332–341 and a modification thereto.

The modification to the SPSA algorithm first appeared in Chin (1994) "A More Efficient Global Optimization Algorithm Based on Styblinski and Tang," *Neural Networks*, Vol. 7, No. 3. pp. 573–574. Let $\theta$ consist of the location and conductivity of the objects and the finite element model parameters and $L(\theta)$ be the loss function. The original SPSA algorithm will be discussed first, then the modified SPSA, which has simple changes to gain sequences. Letting $g(\cdot)$ denote the gradient of $L(\theta)$ with respect to $\theta$, $\hat{\theta}_k$ denote the estimate for $\theta$ at the $k^{th}$ iteration, and $\hat{g}_k(\hat{\theta}_k)$ denote the SPSA approximated gradient at $\hat{\theta}_k$, the SPSA algorithm has the form $$\hat{\theta}_{k+1} = \hat{\theta}_k - a_k \hat{g}_k(\hat{\theta}_k),$$

where the gain sequence $\{a_k\}$ (see step 210a) satisfies certain well-known stochastic approximation conditions Spall (1992). Let $\Delta \in R^p$ be a vector of p mutually independent mean-zero random variables $\{\Delta_1, \Delta_2, \ldots, \Delta_p\}$ satisfying conditions given in Section III of Spall (1992), where p is the number of estimated parameters. Subject to the important conditions in Spall (1992), the user has full control over $\Delta$. The recommended choice for the distribution of $\Delta_i$ is Bernoulli (±1). (Gaussian and uniform are not allowed. Within each iteration, SPSA uses two function evaluations to approximate the gradient, $\hat{g}_k(\cdot)$. In particular, at design levels $\hat{\theta}_k \pm c_k \Delta_k$, with $c_k$ a positive scalar, let $$y_k^{(+)} = L(\hat{\theta}_k + c_k \Delta_k),$$

$$y_k^{(-)} = L(\hat{\theta}_k - c_k \Delta_k).$$

Then the SPSA estimate of $g(\cdot)$ at the $k^{th}$ iteration is $$\hat{g}_k(\hat{\theta}_k) = \begin{bmatrix} \frac{y_k^{(+)} - y_k^{(-)}}{2c_k \Delta_1} \\ \vdots \\ \frac{y_k^{(+)} - y_k^{(-)}}{2c_k \Delta_p} \end{bmatrix}.$$

The sequence $\{c_k\}$, for k=1, 2, ... should satisfy the convergence conditions as they are are stated in Spall (1992). For modified SPSA, the selections of the sequences of a and c are different which is shown in Chin (1994). The sequence of c is changed to a stepwise sequence, as $\{c_1, \ldots, c_1, c_{n+1}, \ldots, c_{n+1}, \ldots\}$ where $c_1$ and $c_{n+1}$ are kept constant for n iterations. The symbol "n" is a number that should be changed according to the function and initial object locations. In our test, n was set to 30; the $c_{n+1}$ ($c_{31}$) is the same "$c_{n+1}$" as in Spall (1992). The reduction rate for a can be twice faster than original SPSA and can be restarted from a larger value as needed (see Chin (1994)). At here, the sequence of $\{a_k\}$ is kept as the same sequence as it is defined in Spall (1992).

Note that SPSA is fundamentally different from infinitesimal perturbation analysis (IPA). SPSA uses only loss function evaluations (step 210d) in its optimization while IPA uses the gradient of the loss function. The SPSA algorithm assumes that prior knowledge of the internal conductivity of the area 102 does not exist. It treats the conductivity profile as the parameter of interest. The two sets of data available to it are the values of the current injected into the area 102 by rods 104, 106 and the potentials measured around the area 102 by sensing electrodes 112. The SPSA algorithm, through an inversion process, finds the internal conductivity profile that optimally fits those potential values measured at the boundary of the area 102. It searches the optimal profile using a loss function, preferably defined as the square of the difference between the calculated potential values and the measured potential values for each sensing electrode 112. In step 210c the conductivity profile shown in FIG. 4 is perturbed, or updated, from the initial arbitrary conductivities according to the result of the loss function by a positive and negative Bernoulli distributed pseudo-random array (step 210b) to produce two perturbed conductivity profile sets. Using this procedure the conductivity profile is updated for all the elements 120, optimizing the conductivity values. To avoid possible multiple-root problems, the SPSA algorithm is For reducing the searching time, the algorithm only requires to update all the elements in region 116. Note that the invention follows two distinct parametric approaches, one for estimating the conductivity of the elements in region 116, and the other for the elements in region 118. The conductivity of the elements in region 118 are not optimized and are kept at the same values throughout the iterations. The loss function mentioned in the SPSA algorithm for the technique of the invention is the square sum of the differences of the measurements versus the FEM computed values.

The following simulations and experiments further demonstrate the ability of the Electrical Conductivity Object Location (ECOL) technique of the invention.

Simulation 1

Figure 5B:
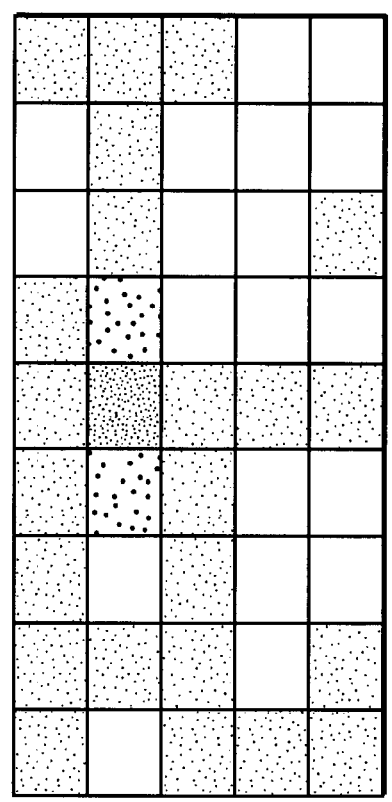
FIGS. 5a and 5b are a reconstruction of the conductivity profile for a simulated plastic object.
Figure 5A:
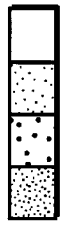

A simulation study was conducted using the field test setting and assuming soil conductivity values as $10^{-3}$ to $10^{-5} \Omega^{-1} m^{-1}$. The purpose of this simulation was to use the invention to locate a simulated buried plastic object. The object occupied two elements of a two-dimensional location representing a slice of a three-dimensional subsurface area as shown in FIG. 5a. The two-dimensional location of FIG. 5a corresponds to region 116 of FIGS. 3a and 3b. The plastic object is located in the fifth and sixth blocks from the left on the second row on the two-dimensional location of FIG. 5a and has a conductivity value of $10^{-8} \Omega^{-1} m^{-1}$. FIG. 5b shows the reconstruction conductivity values in log scale. The log conductivity for soil elements has values between $-3$ and $-5$ and the plastic elements have a value $-8$. The reconstructed conductivity value for the plastic object is larger than $-8$, because the estimated size of object did not occupy one whole element. FIGS. 5a and 5b indicate that there is a plastic object located between elements 4 and 6 of the second row.

Simulation 2

Figure 6B:
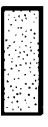
FIGS. 6a and 6b are a reconstruction of the conductivity profile for a simulated metal object.
Figure 6B:
Figure 6A:
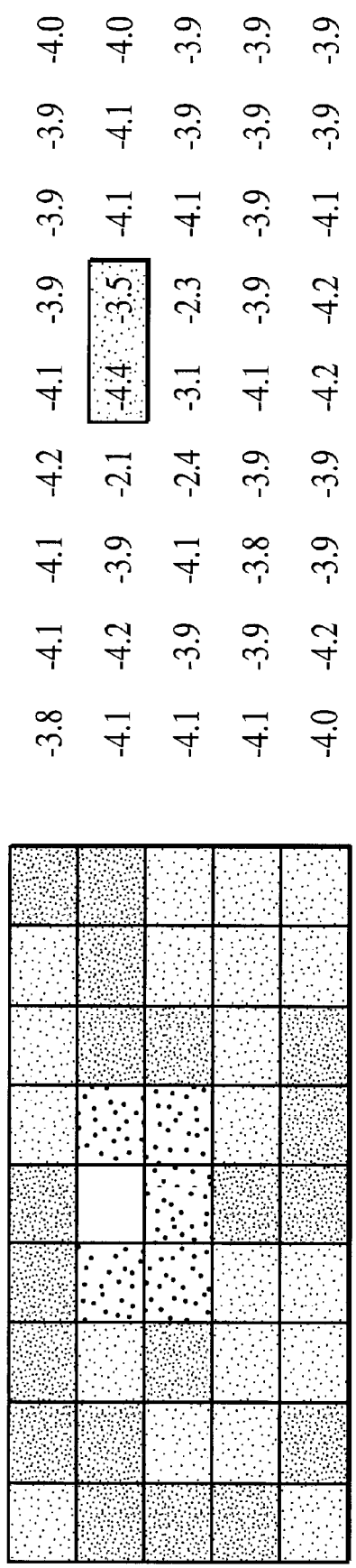

A simulation study was conducted using the field test setting and assuming soil conductivity values as $10^{-3}$ to $10^{-5} \Omega^{-1} m^{-1}$. The purpose of this simulation was to use the invention to locate a simulated buried metal object. The object occupied two elements of a two-dimensional location representing a slice of a three-dimensional subsurface area as shown in FIG. 6a. The two-dimensional location of FIG. 6a corresponds to region 116 of FIGS. 3a and 3b. The metal object is located in the fifth and sixth blocks from the left on the second row on the two-dimensional location of FIG. 6a and has a conductivity value of $5.56 \times 10^4 \Omega^{-1} m^{-1}$. FIG. 6b shows the reconstruction conductivity values in log scale. The log conductivity for soil elements has values between $-3$ and $-5$ and the metal object has a value of 4.7. The log conductivity for metal object is smaller than shown in FIG. 6b, that is, the metal object occupies only a fractional part of elements. FIGS. 6a and 6b indicate that there is a plastic object located between elements 4 and 6 of the second row.

Field Experiment

Figure 7:
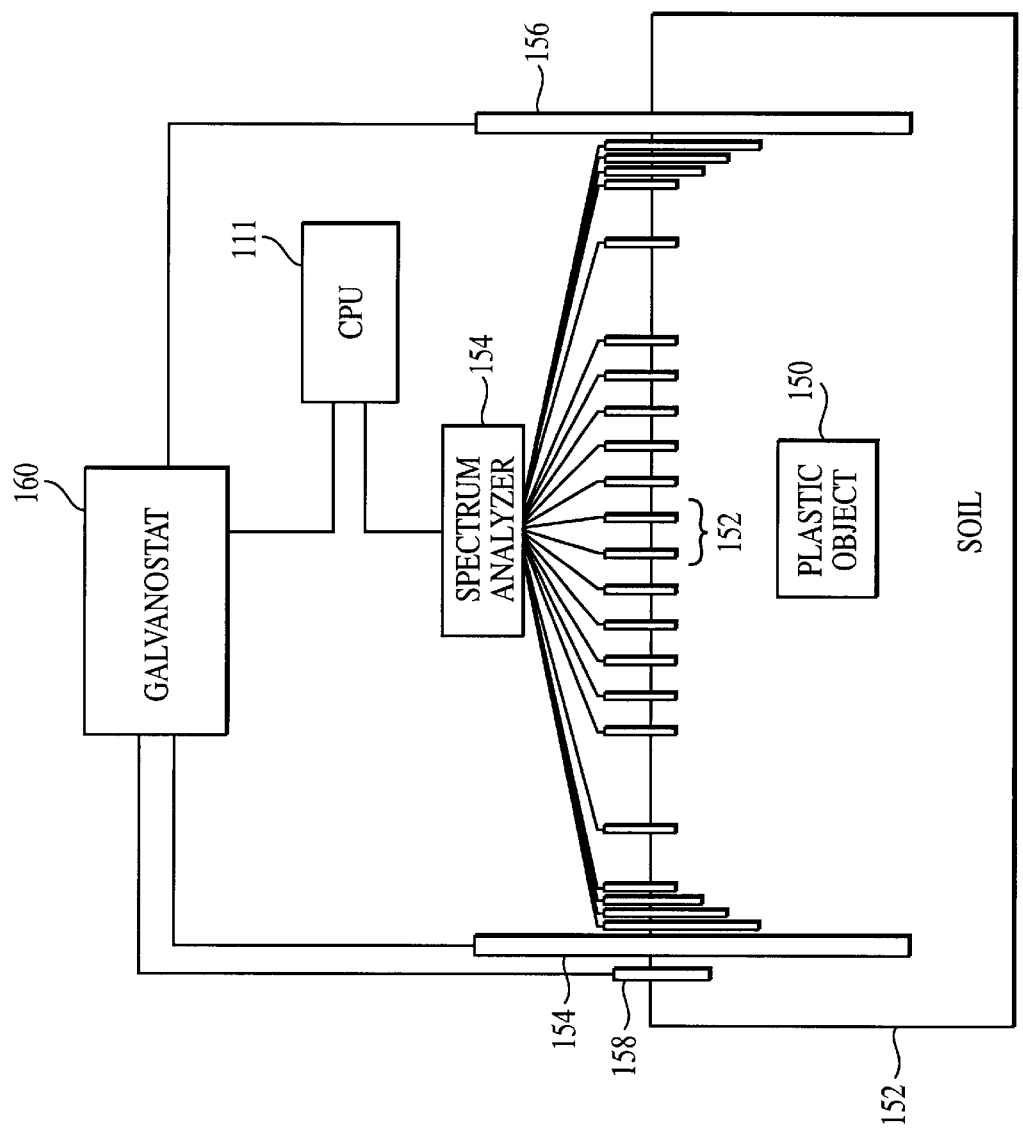
FIG. 7 is a cross-sectional view of an apparatus constructed in accordance with a preferred embodiment of the invention

FIG. 7 is a diagrammatic representation of the experimental site. A 20-cm-diameter diameter, 5-cm-thick plastic object 150 was buried 20 cm below the surface of the soil 152. The object of the experiment was to locate the object 150 using the ECOL technique of the invention. Two partially insulated metal rods 154, 156 were inserted into the soil to the depth of 40 cm; the cylindrical surfaces of the rods were electrically insulated, leaving only their tips conducting. The rods 154, 156 were placed 300 cm from each other. The power source was a galvanostat 160 capable of delivering constant current even under conditions of varying electrical resistance in the soil. A 180±1 mA, low-frequency AC signal was supplied through the summing junction of the galvanostat 160 and forced into the ground through the two rods 154, 156. The currents between the rods 154, 156 were regulated with the help of a silver/silver chloride reference electrode 158 buried close to one of the two rods 154, 156. The flow of the AC current in the soil 152 generated electrical potentials throughout the volume of the soil 152 between the two rods 154, 156. The potential was measured at the surface of the soil 152 and along the boundary of the two rods 154, 156, using silver/silver chloride electrodes 162 and a spectrum analyzer 164. The silver/silver chloride electrodes 162 were spaced along the surface of the soil 152 and the distances between the electrodes 162 and the rods 154, 156 were measured within an accuracy of ±1 cm.

The site in FIG. 7 is represented by a finite element model as shown in FIGS. 8a and 8b. The region represents the cross section of a soil 152 of 100-cm-deep, 500-cm-wide area. There are two distinct regions 116, 118 (FIG. 3a) within the subsurface enlarged in FIGS. 3a and 3b and each region 116, 118 is divided into smaller divisions 170. Each division 170 is an element in the finite element method. The center region 116 (FIGS. 3a and 3b) is a 40-by 90-cm region of interest and is divided into 36 equal size rectangular elements. Next the SPSA algorithm was applied as described above to produce the reconstructed subsurface conductivity values for region 116 as shown in FIG. 8b. The low-conducting plastic object 150 is clearly visible. In addition, the conductivity of the soil, which is much higher than the object, is non-uniform. This is attributed to the presence of pebbles and roots in the soil. The numbers shown in FIG. 8b emerged after only 100 iterations and took less than 5 minutes in a Pentium-equipped computer. Note that this experiment was conducted under a virtual blindfold condition, in which the algorithm made no a priori assumption about the size, location, or conductivity of the plastic object 150 or the conductivity of the soil 152.

The ECOL technique performed in accordance with the invention exhibits superior speed and accuracy in locating subsurface objects through the generation of a subsurface conductivity map produced by measured low-frequency and low-amplitude impressed currents subjected to modified FEM and SPSA algorithm methods. Variations in the conductivities between the surrounding material, e.g. soil, and the buried objects, e.g. plastic or metal objects, are used to locate the objects and to characterize the surrounding material. The technique of the invention is capable of locating plastic and metal objects, such as land mines, buried at depths of about 15 cm to about 5 m, in an area ranging from about 10 to about 30 m$^2$.

While the invention has been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, although delivery of the current to the subsurface area through submerged rods has been described herein, it should be recognized that any current delivery system may be used such as, for example, conductors placed on the surface of the subsurface area. In addition, although the sensing electrodes 112 have been described herein as measuring current levels, it should be recognized that the sensing electrodes 112 may also measure magnetic field strength or voltage drop. Moreover, the invention may be applied to locating objects within concrete (or other) structures such as reinforcing bars (rebars), fibers within composite materials, cells within biological bodies, and many objects in various systems.

What is claimed as new and desired to be protected by Letters Patent of the United States is:

1. An apparatus for locating an object beneath the surface of a body, the apparatus comprising:
   a power supply that injects electric current into the body;
   a meter measuring electrical potential or magnetic field response at the surface to application of the electric current applied by said power supply; and
   a controller for optimizing a conductivity profile of the body using a stochastic approximation;
   wherein said controller performs a stochastic approximation in the form of a simultaneous perturbation stochastic approximation (SPSA).

2. The apparatus of claim 1, wherein the body is soil and the object is a landmine buried in the soil.

3. A method of locating an object beneath the surface of a body, the method comprising the steps of:
   supplying an electric current to the body;
   measuring electrical potential or magnetic field response at the surface to the electric current supplied including the substep of measuring the electrical potential between at least two points on the surface of the body; and
   optimizing a conductivity profile of the body using a non-gradient approximation further including the step of dividing the body into a plurality of elements and performing a finite element method to calculate a potential value at each element;
   wherein said step of optimizing further includes the step of receiving measured and calculated values of elements of the body based on the finite element method and minimizing the differences in values using a simultaneous perturbation stochastic approximation so as to produce a conductivity profile of the body.

4. A method of locating a foreign object buried in a soil subsurface site by characterizing location, size and conductivity of the foreign object, the method comprising the steps of:
   impressing an alternating current (AC) to the soil subsurface site so as to generate AC potentials throughout the soil subsurface site;
   measuring at the surface of the soil subsurface site the AC potentials generated by said impressing step;
   dividing the soil subsurface site into a plurality of elements, and assigning each element an initial arbitrary value of conductivity;
   calculating the potential for the nodes of each element based upon the initial arbitrary conductivity values;
   performing a loss function on the calculated potential values and the measured potential values;
   perturbing the initial arbitrary conductivity values responsive to the loss function to construct a conductivity profile for the soil subsurface site; and
   characterizing the location, size and conductivity of the foreign object from the constructed soil subsurface site conductivity profile.

5. The method of claim 4, wherein said impressing step involves the substep of impressing a low-amplitude, single frequency AC current to the soil subsurface site using electrodes.

6. The method of claim 4, wherein said constructing step further comprises the substep of approximating the conductivity of the plurality of elements using simultaneous perturbation stochastic approximation (SPSA).

7. The method of claim 4, wherein said impressing step comprises generating magnetic fields through out the soil subsurface site; said measuring step comprises measuring the magnetic fields generated by said impressing step; said calculating step comprises calculating the magnetic field for the nodes of each elements based upon the initial arbitrary conductivity values; and said performing step comprises performing a loss function on the calculated magnetic field and the measured magnetic field.

8. The method of claim 4, further comprising the steps defining electrical boundary conditions of the foreign object using Dirichlet electric potential and a Neumann electrical current values.

9. In an object locator used to locate an object in a body, wherein the object locator applies a current to a subsurface of the body and measures an electromagnetic property of the body in response to the application of current, a processor programmed to execute the steps of:

(a) dividing a two-dimensional representation of the subsurface of the body into a plurality of finite elements;

(b) assigning arbitrary values to each of the finite elements representing an electromagnetic property;

(c) calculating nodal values for each node of each finite element based upon the assigned arbitrary values and corresponding to the measured values;

(d) performing a loss function on the calculated nodal values and the measured values corresponding to the calculated nodal values;

(e) modifying the initial arbitrary conductivity values responsive to the loss function to construct a profile of the subsurface of the body;

(d) repeating steps (c) through (e) as many times as are necessary to produce a profile of the subsurface of the body whose calculated nodal values are approximately equal to the corresponding measured values.

10. The object locator of claim 9, wherein the step of modifying the initial arbitrary conductivity values is performed using a Bernoulli distribution.

11. The object locator of claim 9, wherein the step of performing a loss function is performed by using a sum of the squares of the differences of the calculated nodal values and the measured potential values.

12. The object locator of claim 9, wherein the dividing step comprises dividing a three-dimensional representation of the subsurface of the body into a plurality of finite elements.

13. The object locator of claim 9, wherein the object is a plastic pipe or mine or metal pipe or mine.

* * * * *